US012799367B2

(12) United States Patent
Rytka et al.

(10) Patent No.: US 12,799,367 B2
(45) Date of Patent: Nov. 17, 2026

(54) METHOD FOR PRODUCING A FOAMED POLYMER COMPOSITE BOARD FROM MIXED PLASTIC WASTE

(71) Applicant: BOXS AG, Buchs (CH)

(72) Inventors: Christian Rytka, Bad Säckingen (DE); Raphael Markstaller, Buchs (CH)

(73) Assignee: BOXS AG, Buchs (CH)

( * ) Notice: Subject to any disclaimer, the term of this patent is extended or adjusted under 35 U.S.C. 154(b) by 46 days.

(21) Appl. No.: 18/705,045

(22) PCT Filed: Oct. 11, 2022

(86) PCT No.: PCT/CH2022/050029
§ 371 (c)(1),
(2) Date: Apr. 26, 2024

(87) PCT Pub. No.: WO2023/070232
PCT Pub. Date: May 4, 2023

(65) Prior Publication Data
US 2025/0043151 A1 Feb. 6, 2025

(30) Foreign Application Priority Data
Oct. 27, 2021 (CH) ................................ 070458/2021

(51) Int. Cl.
*C09J 5/06* (2006.01)
*B29C 33/18* (2006.01)
(Continued)

(52) U.S. Cl.
CPC ................. *C09J 5/06* (2013.01); *B29C 33/18* (2013.01); *B29C 44/143* (2013.01);
(Continued)

(58) Field of Classification Search
CPC ......................... B29C 44/3446; B29C 44/3442
See application file for complete search history.

(56) References Cited

U.S. PATENT DOCUMENTS 6,612,506 B1 9/2003 Huang
10,543,664 B2 1/2020 Ruckdäschel
(Continued)

FOREIGN PATENT DOCUMENTS

CN 102363659 A 2/2012
CN 103232722 * 8/2013
(Continued)

OTHER PUBLICATIONS

International Preliminary Report on Patentability dated Apr. 30, 2024 for PCT/CH2022/050029, filed Oct. 11, 2022.
International Search Report dated Dec. 22, 2022 and Written Opinion for PCT/CH2022/050029, filed Oct. 11, 2022.

*Primary Examiner* — Nahida Sultana
*Assistant Examiner* — Debjani Roy
(74) *Attorney, Agent, or Firm* — Fleit Intellectual Property Law; Paul D. Bianco; Kaela A. Stephano

(57) ABSTRACT

In a method for producing a polymer composite board from plastic waste, in which the plastic waste is processed in an extruder in a melt-kneading step to form a melt, the melt is introduced into an injector and injected under pressure into a cavity of a closed mold by the injector, in order to form a board. The melt is formed from a free-flowing agglomerate and a blowing agent. The free-flowing agglomerate is produced from unsorted, mixed plastic waste, and the melt is introduced into the closed mold via an injection nozzle along an end side of the cavity, in which mold the melt is foamed and cooled to form a foamed core layer of the polymer composite board.

10 Claims, 4 Drawing Sheets

(51) Int. Cl.

| | |
|---|---|
| ***B29C 44/14*** | (2006.01) |
| ***B29C 44/34*** | (2006.01) |
| ***B29C 44/42*** | (2006.01) |
| ***B32B 5/02*** | (2006.01) |
| ***B32B 5/18*** | (2006.01) |
| ***B32B 5/24*** | (2006.01) |
| ***B32B 27/06*** | (2006.01) |
| ***C09J 5/08*** | (2006.01) |
| *B29K 105/26* | (2006.01) |
| *B29L 7/00* | (2006.01) |

(52) U.S. Cl.

CPC ...... *B29C 44/3415* (2013.01); *B29C 44/3442* (2013.01); *B29C 44/425* (2013.01); *B32B 5/02* (2013.01); *B32B 5/18* (2013.01); *B32B 5/245* (2013.01); *B32B 27/065* (2013.01); *C09J 5/08* (2013.01); *B29K 2105/26* (2013.01); *B29L 2007/002* (2013.01); *B32B 2250/03* (2013.01); *B32B 2260/023* (2013.01); *B32B 2260/046* (2013.01); *B32B 2266/10* (2016.11); *B32B 2272/00* (2013.01)

(56) References Cited

U.S. PATENT DOCUMENTS

| | | | | |
|---|---|---|---|---|
| 2010/0215935 | A1 * | 8/2010 | Fabian Mariezkurrena ................ | B32B 27/32 428/318.6 |
| 2016/0102245 | A1 | 4/2016 | Barthelmess | |
| 2020/0164575 | A1 * | 5/2020 | Yuwaki ................. | B29C 64/209 |
| 2021/0031415 | A1 * | 2/2021 | Escowitz ................ | B29C 44/38 |
| 2022/0002511 | A1 * | 1/2022 | Minnich .................... | C08J 9/06 |

FOREIGN PATENT DOCUMENTS

| | | | | | |
|---|---|---|---|---|---|
| DE | 19800166 | A1 | * | 7/1999 | .............. C08J 9/122 |
| DE | 60106031 | T2 | | 11/2005 | |
| DE | 10 2005 027374 | A1 | | 1/2007 | |
| DE | 102018207937 | A1 | * | 11/2019 | ....... B29C 45/14786 |
| EP | 1645384 | A1 | | 4/2006 | |
| EP | 2933289 | A1 | | 10/2015 | |
| GB | 1243653 | | * | 8/1971 | |
| GB | 2460838 | A | | 12/2009 | |
| GB | 2498717 | A | | 7/2013 | |
| WO | 2013/075991 | A1 | | 5/2013 | |
| WO | 2016/102245 | A1 | | 6/2016 | |

* cited by examiner

METHOD FOR PRODUCING A FOAMED POLYMER COMPOSITE BOARD FROM MIXED PLASTIC WASTE

FIELD OF THE INVENTION

The invention relates to a process for the production of a foamed polymer composite board produced from mixed plastic waste.

BACKGROUND

Process engineering procedures for foaming thermoplastics have been known since the 1950s. Pure plastics are exclusively used in them. Polymeric materials have also been processed into foamed materials since their discovery and technical commercialisation. Not all polymers can be used commercially. Foamed materials produced from PUR, PVC, PE and PS have been particularly successful.

GB 2 498 717 A describes a panel for use in furniture and interiors which comprises a continuous outer skin produced from polystyrene or high impact polystyrene. The skin completely surrounds a cellular plastic core which is formed from a heat-activated particulate plastic material which can be foamed. The panel face is 2440 mm long and the width is 1220 mm. Both the skin and the filler material may comprise recycled plastics.

GB 2 460 838 A describes a machine and a process for forming the above panels. The machine comprises a pair of hingedly connected mold shells which are heated and cooled and which can be clamped together. The process involves placing a particulate plastic material in each opened mold shell and heating the mold shells to form a plastic skin lining each mold shell. An expandable filler material is then placed in one mold shell and the two mold shells are clamped together to form a completely closed cavity. The plastic skins in the two mold shells bond together to form a continuous plastic shell which completely encases the filler material. The mold shells may comprise a network of channels for the circulation of fluid to heat and cool the molds, and insulation jackets.

EP 2 933 289 A1 describes a polymer composition produced from a mixture of plastic waste, the plastic waste being of different types consisting of recycled unidentified, uncleaned, unsorted, compacted and homogenised plastic waste. The composition has a polyethylene fraction of 50-60%, 20-30% polypropylene, 5-10% polystyrene, and a mixture of unidentified plastic and other materials. The mass can be heated upon compaction until it melts. The temperature reached in this manner is between 115° C. and 165° C. Liquefaction of the polymer composition does not occur, however, so that the dimensions of the fractions of the polymer composition are 1 to 10 mm, preferably 5 to 10 mm.

The integral foam boards produced from mixed plastics produced using the above processes do not have any fibres and therefore are not sufficiently rigid. In particular, boards of this type cannot be used as a replacement for the known medium density fibre boards (MDF boards) and plywood. Thus, the boards which have been produced using the above process have not met with market success.

Furthermore, it has been shown that in the case of a compression molding process, introducing the blowing agent together with the plastic granulate leads to highly irregular and occasionally very large pores, because the blowing agent cannot be distributed sufficiently homogeneously. In addition, the formation of blowholes is problematic.

SUMMARY OF THE INVENTION

One aspect of the present invention relates to a production process for a foamed, recycled polymer composite board produced from plastic waste which does not suffer from the disadvantages of known processes. The boards should be capable of being produced in an energy-efficient manner, they should have a very large, homogeneous core layer and have at least the same stiffness as known MDF and plywood boards.

In the process for the production of a plastic board from plastic waste, plastic waste is processed in a melt-kneading step in an extruder to form a melt. In this regard, the melt is formed from a granulated agglomerate and a blowing agent, wherein the granulated agglomerate is produced from unsorted mixed plastic waste. The melt is introduced into an injector and then injected under pressure from the injector into a cavity of a closed mold, in order to form a board. The melt is introduced into the closed mold via an injection nozzle along an end/edge side of the cavity, in which mold the melt foams and cools down to form a foamed core layer of the polymer composite board.

The invention has multiple advantages. Thus, a significantly homogeneous board can be produced because the blowing agent has already been uniformly distributed in the melt. This is possible because the melt is under high pressure until the time of injection into the mold, and so the blowing agent cannot foam up. This only occurs in the cavity, which in addition favours the flow properties and therefore a complete distribution of the melt throughout the cavity. An optimal distribution of the melt is in particular obtained, however, by injecting along an end/edge side of the cavity. In this manner, a uniform flow front is generated which all reaches the end of the cavity on the opposite end/edge side at the same time. The cavity corresponds to the shape of the board. The term "end/edge side of the cavity" means the side which forms an end/edge side or a long side of the board. This may be the longer or the shorter end/edge side. Thus, injection is not carried out from the planar side, which is preferably covered with a cover layer. A further advantage is that the process is more energy efficient, because the mold does not have to be heated up and then cooled down again. Overall, with the process, a foamed polymer composite board can be produced with a fine and uniform pore distribution in the foamed layer. Thus, the polymer composite board attains a homogeneous structure in which the original, variously different plastic parts from different plastics cannot be seen, or can barely be seen, with the naked eye. In addition, the polymer composite board can be produced from recycled mixed plastic waste, i.e. from non-segregated plastic waste which may also contain small quantities of foreign matter.

With the process, it is possible to produce a blowhole-free core layer with a degree of foaming of at least 20%, preferably of 60% to 80%, which has cell dimensions of less than 3 mm, preferably with a diameter of 0.5 to 2 mm. In some embodiments, prior to injecting the melt, a prefabricated upper cover layer and a prefabricated lower cover layer may be placed in the cavity of the mold. The cover layers serve to reinforce the polymer composite board and to structure the surfaces of the polymer composite board individually. Thus, depending on requirements, cover layers produced from different materials, colours, textures etc. may be selected. The cover layers may also be produced from recycled materials, for example from recycled thermoplastics, thermosets or elastomers. The cover layers may, for example, be produced from talc-reinforced polypropylene (PP-TV), polystyrene (PS), styrene-acrylonitrile copolymer (SAN), acrylonitrile-styrene-acrylate copolymer (ASA) or glycol-modified polyethylene terephthalate (PET-G). In addition, fibre-reinforced cover layers with natural, glass or carbon fibres may be considered. Polyolefins, polystyrenes and their copolymers as well as polyesters and polyamides and their copolymers, and also polysulphones and polyethers and their copolymers, are also suitable as recycled thermoplastics. Thermoplastic elastomers may also be considered as components.

The cover layers may have a thickness of 0.5 mm to 5 mm. The foamed core layer may have a thickness of 5 mm to 50 mm. The polymer composite boards may be up to 2 m wide and 4 m long.

In some embodiments, the mold may have an upper mold shell and a lower mold shell, which together form the cavity. The upper cover layer may be sucked onto the inner wall of the upper mold shell by means of a partial vacuum and the lower cover layer may be sucked onto the inner wall of the lower mold shell by means of a partial vacuum. This way, the melt can simply be injected between the two cover layers and can bond with them. Other means for retaining the cover layers are also possible. As an example, they may be held with rods or the like which are withdrawn as the flow front advances.

In some embodiments, the cover layer may be heated with a heating element, for example an infrared emitter, before closing the mold and injecting the melt, in order to obtain better bonding between the cover layer and core layer. As an alternative, it is possible to provide the inside of the cover layer with a plastic film, preferably produced from bio-based plastic, which produces a bond between the cover layer and core layer.

In some embodiments, the injection nozzle may be a wide slot nozzle, and the melt is injected into the cavity of the mold via the wide slot nozzle, which can extend over the entire end/edge side of the cavity. A simultaneous injection over the entire end/edge side of the cavity results in a flow front which runs substantially parallel to the end/edge side, so that at the end of the cavity, the plastic mass reaches the entire opposite end/edge side all at the same time. A rectangular polymer composite board is preferably injected from the widest side.

In some embodiments, the wide slot nozzle may have a row of nozzle openings which are evenly spaced with respect to each other, through which the melt is injected into the cavity of the mold.

In other words, the injection nozzle has a nozzle opening which extends over the entire end/edge side of the cavity (what is known as a wide slot nozzle), or a plurality of uniformly disposed nozzle openings which are distributed along the entire end/edge side of the cavity. These may have a diameter of 5 to 15 nm and are spaced from each other by a maximum of the diameter.

In order to optimise the flow front, the dimensions of the nozzle opening or of the plurality of nozzle openings of the wide slot nozzle may increase towards the two sides. In this way, the lateral, longer flow paths from the injector to the end of the cavity can be balanced out. Because the plastic mass can cool down faster in the edge region of the cavity, the speed in the edge region reduces more quickly than in the central region. This effect can be controlled by a differential cooling of the mold in different sectors.

In some embodiments, the wide slot nozzle may have a closing device which comprises a shaft with through openings for the respective nozzle openings.

In some embodiments, the melt may be injected into the cavity at a low pressure of 15 to 20 bar over up to 30 seconds. Such long injection times are made possible because of the foaming of the melt in the cavity.

In some embodiments, the unsorted mixed plastic waste may be melt-kneaded in the extruder at a temperature of 200° C. to 250° C. until a melt is formed and the closed mold into which the melt is injected is tempered at a low temperature of less than 60° C. The injection nozzle may be heated to a temperature of 200° C. to 250° C.

In the low pressure injection molding process, the plastic mass may therefore be injected slowly into the cavity, preferably between two cover layers. Because of the pressure drop, the melt which is flowing into the cavity starts to foam up. The distribution of the melt is therefore significantly supported by the foaming, whereupon the melt can be injected at low pressure over several seconds. After a cooling phase of a few minutes or even seconds (depending on the board thickness), the mold can be opened. Preferably in this regard, firstly, only the lower suction on the cover layer is stopped, so that the finished polymer composite board is held on the upper mold shell when the mold is opened. A carrier device may be introduced into the open mold, the upper suction can be released and the polymer composite board drops onto the carrier device so that it can then easily be removed from the mold. The mold is then ready for a new cycle.

The invention further relates to a device for the production of a polymer composite board in accordance with the previously described process. The device comprises an extruder, an injector, an injection nozzle and a closed mold with a board-shaped cavity. The injection nozzle is constructed and disposed in a manner such that the melt can be injected into the cavity along an entire end/edge side of the cavity. The cavity may be formed from an upper mold shell and a lower mold shell of the mold.

In some embodiments, the mold may have cooling channels in order to cool it to a temperature of less than 60° C.

In some embodiments, the injection nozzle may be movably disposed with respect to the mold in order to reduce disruptive heat transmission.

In some embodiments, the injection nozzle may be a wide slot nozzle, which preferably has a row of nozzle openings which are uniformly spaced with respect to each other.

In some embodiments, the mold may have an upper mold shell and a lower mold shell, the inner walls of which having holes which are uniformly distributed over the surface, which are connected to a pump which produces a partial vacuum. In this manner, an upper or a lower cover layer can be held in the desired position in the cavity.

Furthermore, the device may also have the structural features described above in respect of the process.

The invention further encompasses a polymer composite board produced from mixed plastic waste which is preferably produced with the process described above. The polymer composite board comprises a core layer produced and foamed from unsorted mixed plastic waste, the core layer having been injected between an upper cover layer and a lower cover layer. The core layer produced from mixed plastic waste is blowhole-free and has a degree of foaming of at least 20%, preferably of 60% to 80%, with cell dimensions of less than 3 mm, preferably with a diameter of 0.5 to 2 mm. The mixed plastic waste may also contain foreign matter.

The cover layers may also be produced from recycled materials, as already described above. As an example, the cover layers may be produced from talc-reinforced polypropylene (PP-TV), polystyrene (PS), styrene-acrylonitrile copolymer (SAN), acrylonitrile-styrene-acrylate copolymer (ASA) or glycol-modified polyethylene terephthalate (PET-G). In addition, fibre-reinforced cover layers with natural, glass or carbon fibres may be considered.

The entire polymer composite board may be produced from recycled material.

The cover layers may have a thickness of 0.5 mm to 5 mm. The foamed core layer may have a thickness of 5 mm to 50 mm. The polymer composite boards may be up to 2 m wide and 4 m long.

In the case of very large boards, a plurality of wide slot nozzles disposed beside one another and a plurality of injectors may be employed.

BRIEF DESCRIPTION OF THE DRAWINGS

The invention will now be described in more detail with the aid of exemplary embodiments and with reference to the drawing(s), in which.

DETAILED DESCRIPTION

Figure 1A:
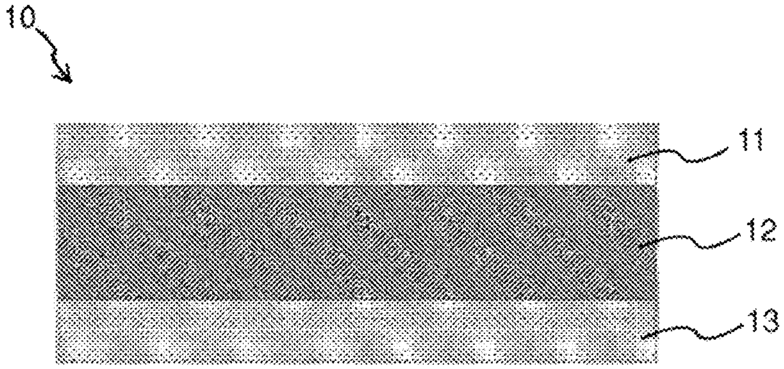
FIGS. 1A and 1B show (a) a diagrammatic view (FIG. 1A), and (b) a photograph (FIG. 1B) of a polymer composite board with a core layer produced from mixed plastic waste.
Figure 1B:
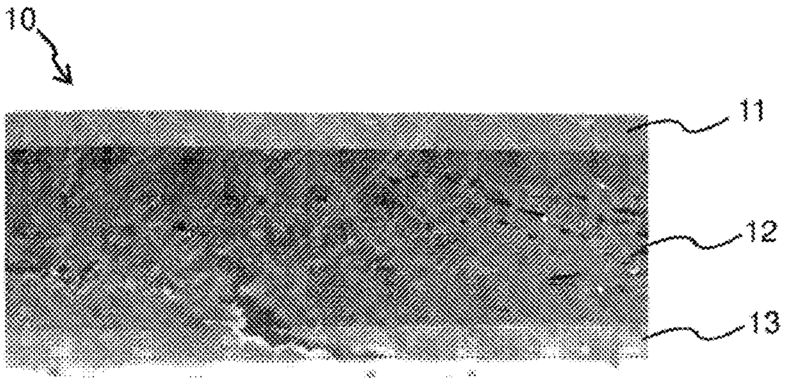

FIGS. 1A and 1B show a section through a polymer composite board 10 which has been produced in accordance with the process described above. FIG. 1A shows a diagrammatic view and FIG. 1B shows a photograph of the polymer composite board 10. The polymer composite board 10 has an upper cover layer 11 and a lower cover layer 13. A foamed core layer 12 has been injected between the two cover layers 11, 13.

The core layer 12 is produced from mixed plastic waste, which is mixed as a granulated agglomerate with a blowing agent and is injected between the cover layers as a melt. In this way, the plastic mass can foam up uniformly, whereupon a fine and uniform pore distribution is obtained. Thus, the core layer contains a homogeneous structure in which the original various different plastic parts of different plastics cannot or can barely be distinguished from each other with the naked eye.

Glass fibre waste or carbon fibre waste, for example from industrial waste, shredded rotor blades or old boats, inter alia, may be used for the cover layer of the polymer composite board. This may be embedded as a powder fraction in a thermoplastic matrix, for example produced from polyethylene (PE), polypropylene (PP), polystyrene (PS) or acrylonitrile-butadiene-styrene (ABS). Waste of this type comes into recycling firms and cannot readily be upgraded. It is therefore incinerated. As an alternative to glass fibre waste, recycled nonwoven materials, for example from composite waste (glass fibres, natural fibres, artificial fibres and carbon fibres), and electrodynamically fragmented thermoplastic composite fragments may also be considered.

Figure 2:
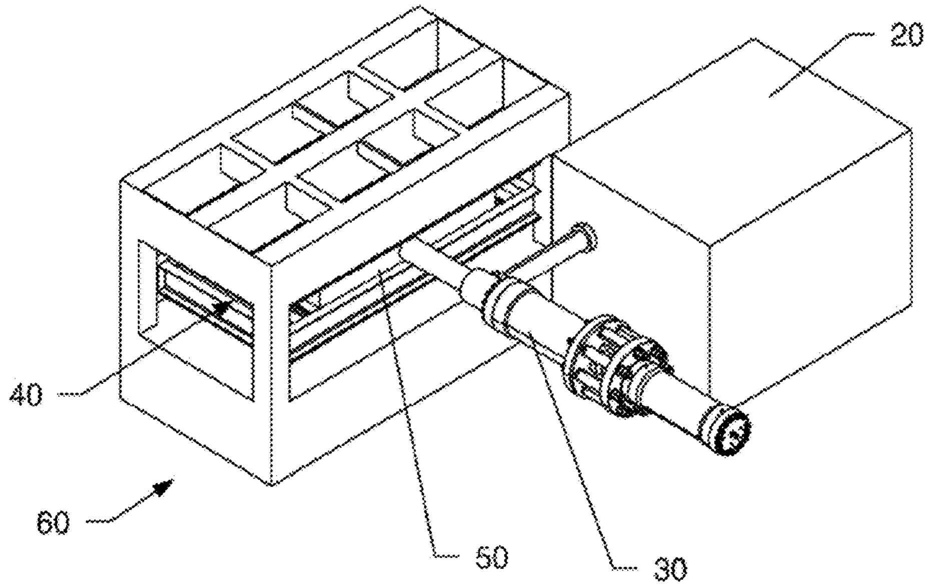
FIG. 2 shows a perspective view of a device for the production of a polymer composite board in accordance with FIGS. 1A and 1B.

FIG. 2 shows a perspective view of a device for the production of a polymer composite board in accordance with FIGS. 1A and 1B. The device comprises a press 60 in which a closed mold 40 is disposed, i.e. in the closed form, the mold 40 forms a cavity 41 for the injection of a melt (in contrast to an open mold, into which all of the ingredients are introduced before closing). Furthermore, the device comprises an extruder 20 for the preparation of the melt and an injector 30 for injecting the desired quantity of the melt into the cavity 41 through an injection nozzle 50.

Figure 3:
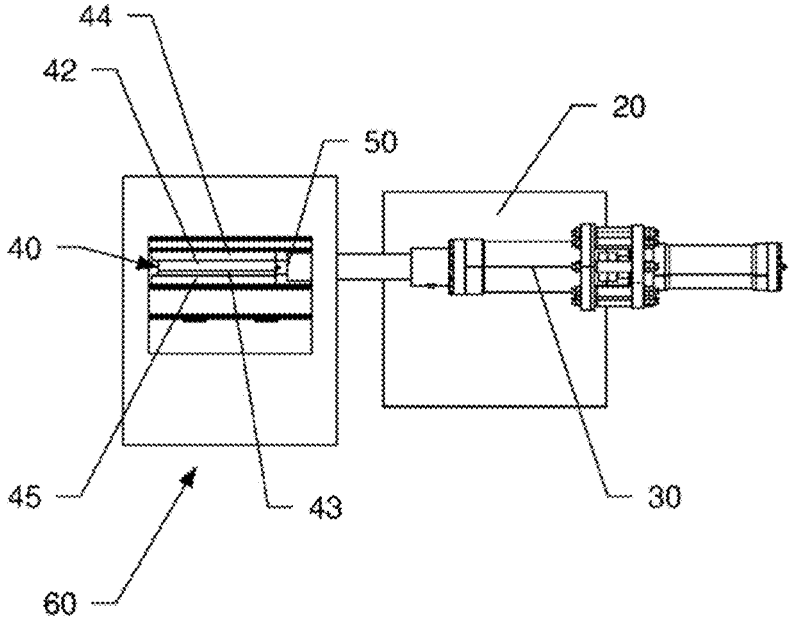
FIG. 3 shows a side view of the device of FIG. 2 with the mold in the closed state.

FIG. 3 shows a side view of the device of FIG. 2 with the mold 40 in the closed state. The mold 40 comprises an upper mold shell 42 and a lower mold shell 43 which together form the cavity 41. The cavity 41 has an opening along an end/edge side, to which the injection nozzle 50 is connected for injection of the melt. The mold 40 furthermore comprises an upper retaining plate 44 for the upper mold shell 42 and a lower retaining plate 45 for the lower mold shell 43. Heating/cooling channels are provided in the two retaining plates 44, 45 in order to bring the mold shells 42, 43 to the desired process temperature or to keep them at the desired process temperature. Furthermore, the two retaining plates 44, 45 are respectively connected to a suction device the suction openings 46 of which (see FIG. 5) are respectively disposed in the upper mold shell 42 or the lower mold shell 43. The respective cover layers 11, 13 of the polymer composite board can be held by suction and retained in the correct position.

Figure 4:
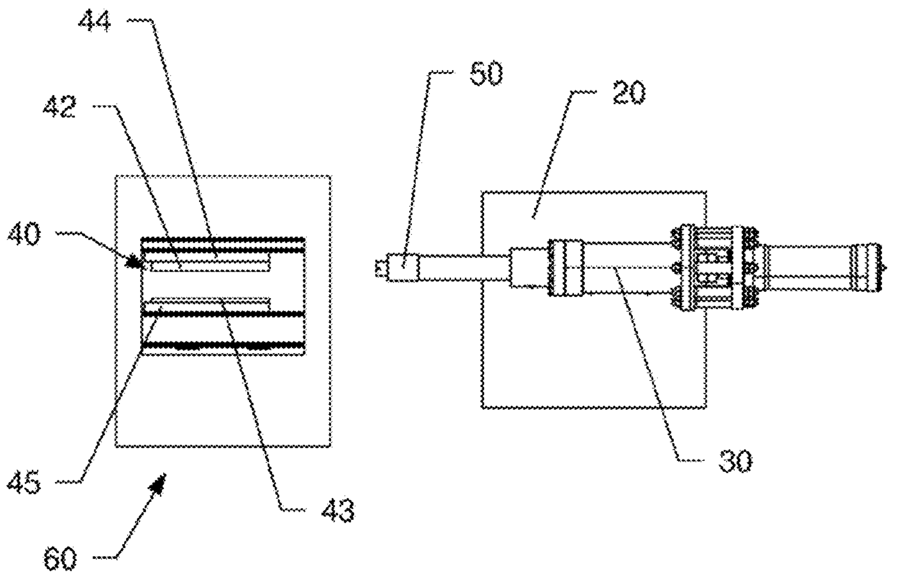
FIG. 4 shows a side view of the device of FIG. 2 with the mold in the open state.

FIG. 4 shows a side view of the device of FIG. 2 with the mold in the open state. In the open state, the press 60 and the injection molding device (extruder 20, injector 30, injection nozzle 50) can be moved away from each other in order to prevent the transfer of heat from the hot injection nozzle 50 to the cold mold 40.

Figure 5:
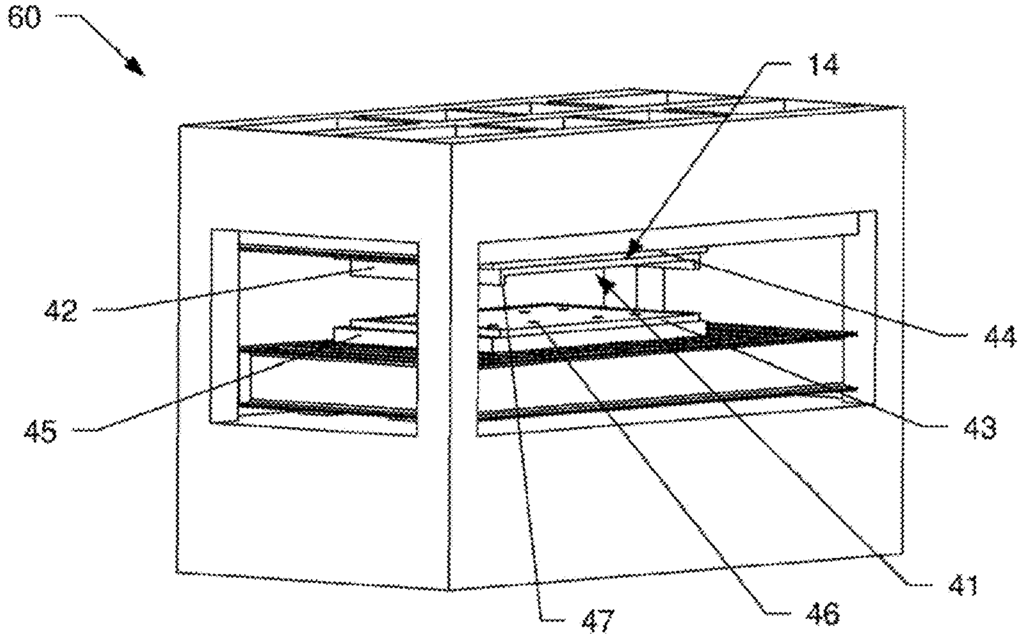
FIG. 5 shows a perspective view of the press of FIG. 2 in the open state.

FIG. 5 shows a perspective view of the press of FIG. 2 in the open state. Here, the suction openings 46 in the lower mold shell 43 can be seen. Suction openings of this type are also present in the upper mold shell 42. The mold shells each have side walls 47 which delimit the cavity 41. In the embodiment shown, the upper side walls 47 are higher than the lower walls. These also serve to position the cover layers 11, 13 correctly.

Figure 6:
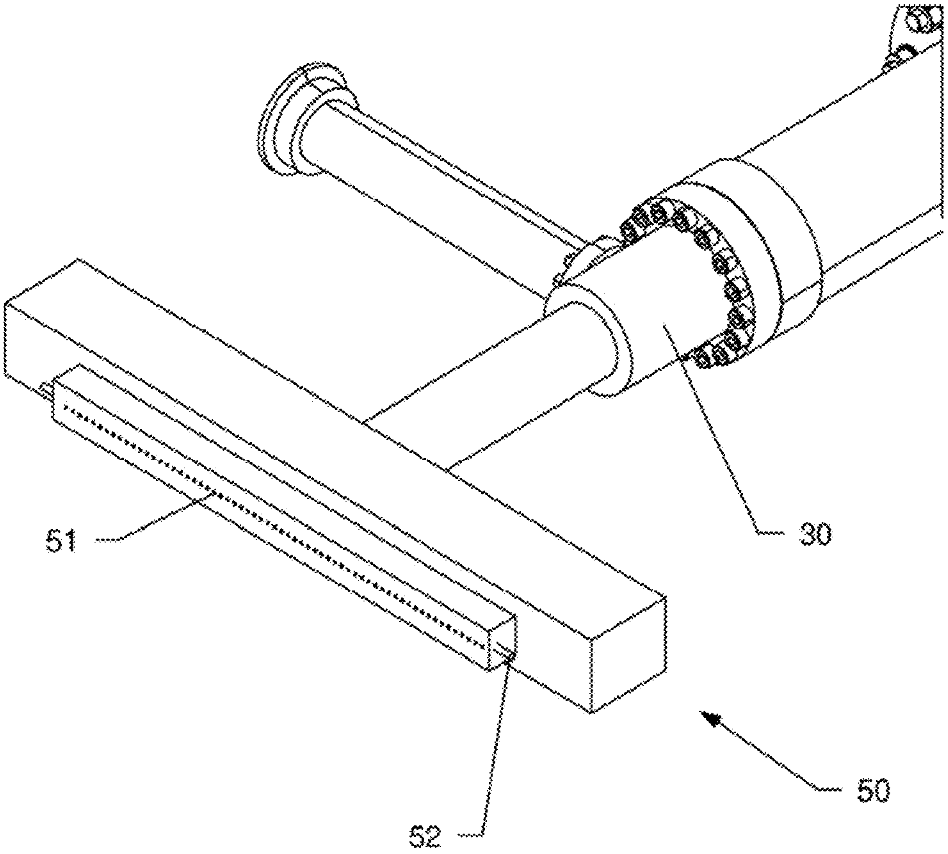
FIG. 6 shows a perspective view of a nozzle of the device of FIG. 2.

FIG. 6 shows a perspective view of the injection nozzle 50. The injection nozzle 50 is a wide slot nozzle which extends over the entire end/edge side of the cavity 41 or the mold 40 in order to inject the melt over the entire end/edge side of the cavity 41. In the embodiment shown, the injection nozzle 50 has a plurality of regularly spaced nozzle openings 51. Preferably, they are circular and their diameter increases from the centre to the respective sides. In this way, the melt can be injected with a uniform flow front, so that the flow front all reaches the end of the cavity 41 at the same time over the entire opposite end/edge side. Furthermore, the injection nozzle 50 may have a closing device 52, which in the embodiment shown has a shaft with a plurality of through openings for the respective nozzle openings 51. The nozzle openings can be closed or opened by turning the shaft.

The device shown in FIGS. 2 to 6 may be used for the process for the production of a polymer composite board 10 from mixed plastic waste described above. Here, an agglomerate of mixed plastic waste is mixed with a blowing agent and processed in the extruder 20 into a melt. A quantity used for a polymer composite board passes from the extruder 20 into the injector 30 and is then injected through the injection nozzle 50 into the cavity 41 to mold the polymer composite board.

Before the injection procedure, the cover layers 11, 13 are placed in the open cavity 41 and sucked onto the two mold shells 42, 43. The melt is then injected into the closed mold, in which it foams up and bonds with the cover layers. The foamed core layer 12 of the polymer composite board 10 is formed in this manner. In the mold 40, the core layer 12 cools down and the mold 40 can be opened in order to unmold the polymer composite board 10. Preferably, the lower suction here is switched off first in order to retain the polymer composite board 10 on the upper mold shell 42. A suitable tool can be driven between the mold shells 42, 43, the upper suction can be switched off and the finished polymer composite board 10 can therefore easily be removed from the press 60.

LIST OF REFERENCE NUMERALS

10 polymer composite board
11 upper cover layer
12 foamed core layer
13 lower cover layer
14 end/edge side of cavity
20 extruder
30 injector
40 closed mold
41 cavity
42 upper mold shell
43 lower mold shell
44 upper retaining plate
45 lower retaining plate
46 suction openings
47 side wall
50 injection nozzle
51 nozzle openings
60 press

The invention claimed is:

1. A process for the production of a polymer composite board from plastic waste, the process comprising:
- processing the plastic waste into a melt by a melt-kneading step in an extruder;
- introducing the melt into an injector while maintaining the melt under pressure;
- injecting the melt while maintaining the melt under pressure from the injector into a cavity of a closed mold in order to form a board,
- wherein the melt is formed from a granulated agglomerate and a blowing agent, wherein the granulated agglomerate is produced from unsorted mixed plastic waste,
- wherein the melt is introduced into the closed mold via an injection nozzle along an entire end/edge side of the cavity, wherein, upon entry into the cavity, the melt undergoes a pressure drop, and as a result of the pressure drop the melt starts to foam, thereby supporting distribution of the melt throughout the cavity, in which mold the melt foams and cools to form a foamed core layer of the polymer composite board, and
- wherein maintaining the melt under pressure until the melt is injected into the cavity of the closed mold prevents foaming of the melt, such that the melt is prevented from foaming until the melt is in the cavity of the closed mold.

2. The process as claimed in claim 1, wherein prior to injecting the melt, a prefabricated upper cover layer and a prefabricated lower cover layer is placed in the cavity of the mold.

3. The process as claimed in claim 2, wherein the mold has an upper mold shell and a lower mold shell which together form the cavity, and the upper cover layer is sucked onto the inner wall of the upper mold shell by means of a partial vacuum and the lower cover layer is sucked onto the inner wall of the lower mold shell by means of a partial vacuum.

4. The process as claimed in claim 1, wherein the injection nozzle is a wide slot nozzle, and the melt is injected via the wide slot nozzle, which extends over the entire end/edge side of the cavity, into the cavity of the mold.

5. The process as claimed in claim 4, wherein the wide slot nozzle has a row of nozzle openings which are evenly spaced with respect to each other, through which the melt is injected into the cavity of the mold.

6. The process as claimed in claim 5, wherein the wide slot nozzle has a closing device which comprises a shaft with through openings for the respective nozzle openings.

7. The process as claimed in claim 1, wherein the melt is injected at a low pressure of 15 to 30 bar.

8. The process as claimed in claim 1, wherein the unsorted mixed plastic waste is melt-kneaded in the extruder at a temperature of 200 degrees centigrade to 250 degrees centigrade until a melt is formed and the closed mold into which the melt is injected is tempered at a low temperature of less than 60 degrees centigrade.

9. A process for the production of a polymer composite board from plastic waste, the process comprising:
- processing the plastic waste into a melt by a melt-kneading step in an extruder at a temperature of 200° C. to 250° C.;
- introducing the melt into an injector while maintaining the melt under high pressure to prevent foaming;
- injecting the melt under pressure from the injector into a cavity of a closed mold in order to form a board,
- wherein the melt is formed from a granulated agglomerate and a blowing agent, wherein the granulated agglomerate is produced from unsorted mixed plastic waste, and
- wherein the melt is introduced into the closed mold via a wide slot injection nozzle along an entire end/edge side of the cavity, at a pressure of 15 to 20 bar over an injection time of up to 30 seconds, wherein, upon entry into the cavity, the melt undergoes a pressure drop, and as a result of the pressure drop the melt starts to foam, thereby supporting distribution of the melt throughout the cavity, in which mold the melt foams and cools to form a foamed core layer of the polymer composite board that is blowhole-free and has a degree of foaming of 60% to 80% with cell dimensions having a diameter of 0.5 to 2 mm.

10. The process as claimed in claim 1, wherein the cavity of the closed mold has a fixed geometry corresponding to the shape of the board, said geometry being established before the melt begins to foam, and the melt foams and distributes within the cavity while the cavity retains said geometry.

* * * * *